United States Patent Office 2,921,315
Patented Jan. 19, 1960

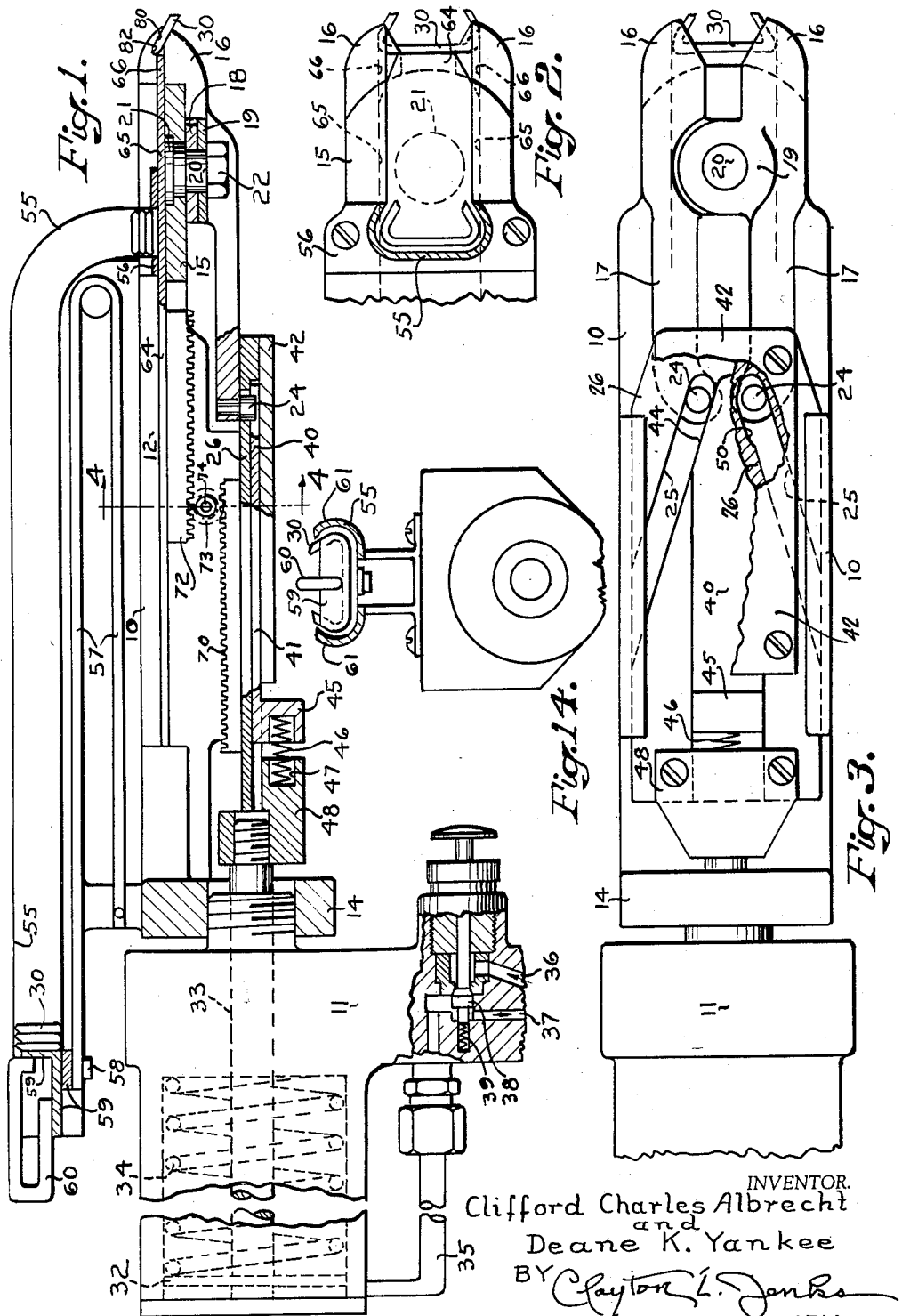

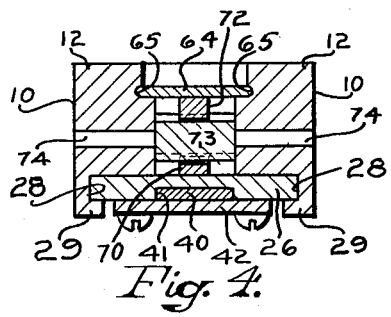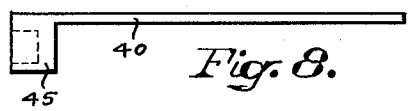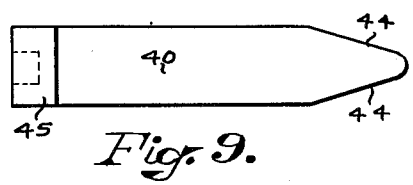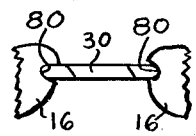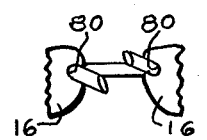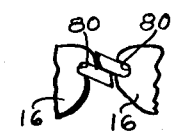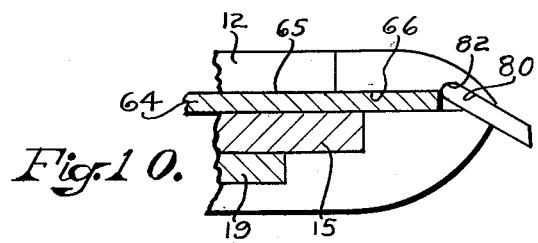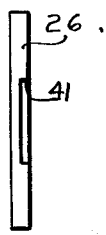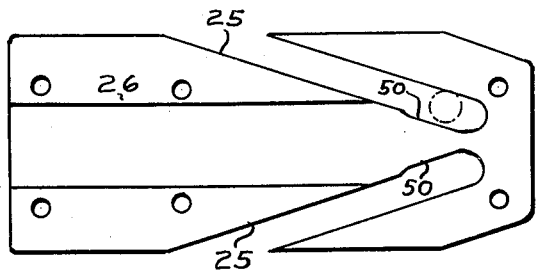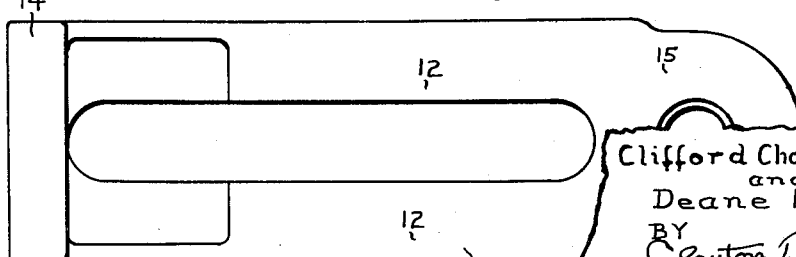

2,921,315

POWER ACTUATED C-RING CLINCHING TOOL

Clifford Charles Albrecht, Leicester, and Deane K. Yankee, Sterling, Mass., assignors to Novelty Tool Company, Inc., Spencer, Mass., a corporation of Massachusetts Application February 25, 1957, Serial No. 641,878

15 Claims. (Cl. 1—187)

This invention relates to a power actuated C-ring clinching tool, and more particularly to a tool which, under the control of the operator, will present an open ring to a pair of jaws and thereafter close the ring.

A C-ring is formed of wire, usually with pointed ends, and is adapted for connecting parts together, such as for securing upholstery to the frame of an automobile seat. A tool for clinching the C-ring usually comprises two jaws and a pusher so arranged relative to a feed magazine that a single ring may be pushed along a guideway into the jaws and the latter then forced together to close the ring.

One of the problems in such a tool involves holding the ring securely in position in the jaws while it is being inserted into the goods. It has been proposed to provide the jaws with a converging guide path for the ring and to force the ring under pressure along that path into a tight engagement with the jaws, so that the ring is partially closed by the pressure. This preliminary distortion of the ring shape prior to its insertion in the goods is objectionable, since the initial shape and the full width of the spacing between the C-ring legs should be maintained until it is desired to close the ring. It is desirable to hold the open C-ring firmly in place prior to the closing of the jaws and preferably under a slight resiliency to insure a frictional tightness up to the moment that the closing of the jaws is started.

The C-ring in an open condition is so positioned in the jaws of a clinching tool that its free legs project forward beyond the jaws for insertion into the goods and the ring is thereafter closed or the legs are clinched together by means of the tool jaws. If the legs of the ring project straight outwardly in alignment with the ring feed channel, it is often found difficult to apply the ring near a corner or a projection and to draw a fabric properly into position. It is desirable to have the open ring arranged at such an angle in the jaws that it may be inserted obliquely into the goods without obstruction from the goods or the operating parts of the tool.

It has also been proposed to have two separate laterally displaced grooves in each tool jaw, one for feeding the C-ring forward and the other for receiving and holding the ring during the clamping operation and to cam the ring laterally from the feeding groove into the final jaw groove. It is, however, desirable to have a single continuous groove for feeding the ring unobstructedly, and particularly if the ring is to be held in an oblique arrangement in the jaws. Also, the continuous curved groove should be so shaped that the ring may be moved freely therealong and yet any back pressure on the ring is absorbed by the shape of the groove.

The primary object of this invention is to satisfy the above outlined features and to provide a C-ring clinching tool which will feed the ring forward through a parallel walled feed groove into position between the jaws and which will hold the ring frictionally and without distortion under a slight resilient or yielding pressure until the jaw movement serves to bend the ring into its final closed shape.

A further object is to provide a power tool of this type having a body carrying C-ring clinching jaw levers moved by a reciprocable cam which presents a C-ring to the jaws in an angular arrangement relative to the center line of the body and the cam.

Another object is to provide a ring clinching structure in which a camming device serves to open the jaws and a pusher operates to feed a ring to the opened jaws.

A further object is to provide a tool with two continuous ring feeding grooves so arranged relative to the ring supply guide that a ring will be automatically pushed into the jaws and be caused to turn into an obliquely arranged position by the forward motion of the pusher.

Another object is to provide a tool of this type in which the C-ring is moved down two opposed feeder grooves to the jaws and ultimately rotated about the connecting back portion of the ring to present the legs of the ring obliquely positioned relative to the direction of the pusher feed groove.

A further object is to provide a pneumatic tool of this general type in which the pusher remains forward against a ring in the jaws while the tool is at rest and supplements the groove shape in holding the ring in position for insertion into the goods and which thereafter retreats from its forward position when the power is applied to the jaws to close the ring.

Another object is to apply a low resilient pressure to the jaws and hold them yieldingly pressing firmly against the open ring to maintain the ring in a correct position without distortion while the pusher retreats and the jaws are being closed.

Another object is to provide the parallel jaw grooves with pockets so shaped as to insure that the ring is maintained in position against an externally applied pressure even after the pusher has been withdrawn and wherein the pusher locks the ring in the pockets when it is held forward.

Further objects will be apparent in the following disclosure.

According to one phase of our invention, we provide a pair of clinching jaws moved by manually controlled power mechanism including levers which are suitably operated, as by a cam and associated followers. A ring is fed forward through parallel channels by a power driven pusher which preferably maintains the ring in the jaws during the rest period of the tool. The jaws are preferably urged resiliently and yieldingly into frictional engagement with an open ring fed thereto. The ring feeding and the final clinching stage are preferably accomplished by positively acting cam mechanism, and the yielding pressure of the jaws against the open ring is effected by a spring connection between the jaws and the power mechanism. The pusher is moved rearwardly as the jaws are closed, and preferably by means of rack bars and an inter-connecting pinion. The jaws may be provided with curved channels which cause the ring to be rotated about the axis of its back and thus be presented at an angle relative to a longitudinal center line of the tool, and the curved jaw groove may have a pocket which receives any rearward thrust against the ring.

Referring to the drawings illustrating one embodiment of the tool:

Fig. 1 is a central longitudinal elevation of an air operated tool, with parts in section and broken away, and with the C-ring shown in the jaw at an oblique angle relative to the feeding grooves;

Fig. 2 is a fragmentary top plan view of the forward jaw portion of the tool;

Fig. 3 is a plan view of the reverse side of the tool with parts broken away or in section;

Fig. 4 is a section on the line 4—4 of Fig. 1;
Fig. 5 is a fragmentary plan view of the tool body or frame;
Fig. 6 is a plan view of the upper cam plate;
Fig. 7 is a rear end view of the plate of Fig. 9;
Fig. 8 is a side elevation of the lower cam plate;
Fig. 9 is a plan view of the lower plate;
Fig. 10 is an enlarged fragmentary sectional view of one of the jaws showing the curved ring feeding groove with a ring supported against a groove pocket in the jaw;
Figs. 11, 12 and 13 show fragmentary details indicating the relationship of the opposed jaw grooves and indicating the clinching movement of the legs of the C-ring as the jaws are closed; and
Fig. 14 is a fragmentary section showing the ring feeding trough.

The device illustrated in the drawings is a gun type of tool having a body 10 carried by a depending handle 11. The body comprises two spaced longitudinal bars 12 connected at the rear end by a cross bar 14 (Figs. 3 and 5) and at the front by a transverse bar 15 (Figs. 1 and 5), the space therebetween being arranged for sliding members which feed the rings and operate the jaws. The two jaws 16 (Figs. 1 to 3) are formed as the front ends of two levers 17 of the first class which respectively have inwardly projecting disc portions 18 and 19 shaped as thin pivot plates which are pivotally mounted on a pivot pin 20 having a head 21 mounted in a hole in the front portion 15 of the body and held in place by a nut 22 engaging the under plate 19, as shown in Fig. 1.

In order to close the jaws, the rear arms of the jaw levers 17 are offset and provided with cam follower pins 24 positioned in the two obliquely arranged cam slots 25 in a longitudinally slidable upper cam plate 26, the shape of which is shown in Fig. 6. The cam plate 26 is slidably mounted in two parallel grooves 28 (Fig. 4) in the depending ledges 29 of the tool body 10. When the cam plate 26 is moved forward towards the right, the follower pins 24 ride up the inner walls of the slots 25 and so cause the jaws 16 to approach each other and thus to clinch the open C-ring 30 which has been previously located therein. When the cam plate moves towards the left, the followers engage the outer slot faces and forcibly open the jaws. Thus, the cam moves the jaws positively in each direction.

The cam plate 26 is moved longitudinally of the tool by means of an air cylinder piston 32 (Fig. 1) having its piston rod 33 connected positively to the cam plate 26 and returned to the left hand end of the piston chamber by a spring 34 where it remains idle until actuated by the air pressure.

The helical spring 34 is located between the piston and the right hand end of the piston chamber. The piston is moved toward the right to cause operation of the tool jaws by means of air under pressure which is admitted through a suitable three-way valve. As illustrated in Fig. 1, this may comprise a pipe line 35 opening into the space at the rear of the piston, and controlled by a three-way valve system having an air inlet 36 and an outlet 37 controlled by a plunger operated valve 38 and which is conveniently located on the handle for operation by the workman. The valve 38 serves to connect the air inlet 36 with the pipe line 35 and piston chamber and it is urged by a spring 39 to an inoperative position where it exhausts the air from the piston chamber when the plunger is released. Various constructional details may be provided for this purpose.

A primary feature of this invention relates to imposing a resilient pressure on the jaws to hold a C-ring therein. To provide this resilient gripping of the ring, a second cam plate 40 is slidably mounted in a groove 41 on the under side of the cam plate 26. This lower plate 40 (Fig. 4) is held in place by a cover plate 42 suitably attached, as by cap screws, to the under side of the upper slide plate 26. The upper plate 26 has U-shaped diverging cam slits 25 formed therein, as shown particularly in Fig. 6. The lower cam plate 40 has a nose portion providing the diverging cam surfaces 44 (Fig. 9). This lower plate has a downwardly depending lug 45 which is permitted a limited movement to the left of the cover plate 42, as is indicated in Fig. 1. This lower cam plate is urged toward the right by a compressed helical spring 46 having one end located in the socket in the lug 45 and its other end in a socket 47 in the depending L-shaped member 48 suitably spaced from the lug 45 to provide for the necessary movement. The member 48 has an upwardly projecting portion suitably fixed on the end of the piston rod 33. The upper cam plate 26 is suitably secured, as by screws, to the member 48, so that it is rigidly connected to the piston rod and positively moved thereby.

The helical spring 46 is maintained under compression so that the spring urges the cam nose portion 44 forward into engagement with the cam follower pins 24. Thus the constant pressure of the spring 46 urges the jaws 16 towards a closed position and applies a resilient or yielding pressure against the ring 30. In order to provide for a slight lateral movement of the pins 24 relative to the slots 25 of the upper cam plate, the inner faces of the cam slots 25 of the positively moved plate 26 are cut away at 50 (Figs. 3 and 6) for a short distance so that the pins 24 will not touch the inner face portion 50 but will be moved only by the nose ends 44 of the lower plate. That is, when the C-ring 30 is thrust into place within the jaws 16, as will be described, the cam follower pins 24 are governed in their positions by the nose of the lower resiliently moved slide plate 40 and they are out of contact with the walls of the cut away portions 50 of the cam slots 25 of the upper cam plate. Hence, when the cam plate 26 is moved toward the right, the spring urged plate 40 travels with the plate 26 but has a freedom of motion provided by the spring 46 which governs the positions of the cam pins 24 and so gives a slight yielding pressure against the C-ring in the jaws. When the cam plates are, however, moved far enough toward the right, then the straight line upper portions of the cam slots 25 take over control of the movement of the jaws, and thereafter there is a positive closing action due to the non-yielding forward movement of the upper cam plate 26. The lower cam plate 40 serves primarily during the time of feeding the C-ring into position in the jaws to provide a yielding clamping action thereon, but that plate 40 does not materially aid in the jaw closing operation which is accomplished by the non-yielding cam plate 26.

A supply of C-rings is provided by a substantially U-shaped trough or guide 55 within which the C-rings are fed. One end of the guide is welded to a plate 56 (Fig. 1) suitably connected, as by screws, to the body 10. The C-rings 30 are urged toward the tool by means of a highly elastic rubber cord 57 suitably secured at one end to a fixed portion of the tool body. The other end of the rubber band is connected to a pin 58 carried by the L-shaped slide plate 59 which has a handle 60 suitably shaped and attached thereto. The slide plate 59 moves within the guide trough 55 and has the handle 60 slidable between the spaced flanges 61 of the trough as is indicated in Fig. 14. By pulling the slide plate 59 to the left of the end of the feed trough 55, a new supply of C-rings may be inserted therein. The rubber cord forces the rings 30 along the guide trough 55 and through the opening in the plate 56 and into position for being forced toward the jaws.

The rings are moved serially to the jaws by a reciprocable pusher plate 64 slidably mounted in two inwardly facing opposed grooves 65 of the frame members 12, as is best shown in Fig. 4. These grooves are of such dimensions as to permit a single C-ring 30 to slide forward in the groove to a communicating groove 66 (Figs. 1 and 10) in each of the jaws. When the slide plate 64 is drawn to the left in groove 65, it clears the opening in the feed trough plate 56, so that a ring may be thrust by the rubber spring 57 into the grooves 65. Then, when the plate 64 is moved toward the right, a ring is picked from the bottom of the pile in the trough and fed toward the jaws. The rings are so positioned in the feed trough 55 and the grooves 65 that their prongs or legs face forward, as shown in Fig. 2. The pusher 64, therefore, engages the rear or connecting back portion of the rings. The grooves 65 in the tool body 10 are parallel and substantially aligned with the parallel opposed grooves 66 in the two jaws, and these jaw grooves are so shaped that the ring slips freely from the parallel feed grooves into placed within the jaws.

One feature of this invention comprises moving the C-ring forward to the jaws when the piston returns to its inoperative rearmost position in the piston chamber, and at the same time opening the jaws to provide for reception of a new C-ring. To provide this opposed movement of the feed plate 64 and the jaw operating upper cam plate 26, the cam plate is provided with a rack bar 70 and the feed plate 64 has a corresponding rack bar 72. These two opposed rack bars mesh with a gear 73 therebetween which is pivotally carried by a pivot pin 74 (Fig. 4) which is suitably mounted in the two side body members 12. The rack bars are of such length and arrangement as to provide for a full motion of the piston and the required cam operation of the jaws and the forward slide movement of the ring feeding plate 64. Hence, when the upper cam plate 26 moves rearwardly toward the left, the pusher plate 64 moves forward and thrusts a C-ring into the jaws 16. While the piston 32 remains at rest under the pressure of the spring 34, the pusher plate 64 is thus held in its foremost location, and so aids in holding a C-ring in place in the jaws 16 as required for insertion into a piece of fabric or otherwise as needed. The pusher plate 64 and the upper cam plate are positively moved in a definite cycle by the piston, and only the lower cam plate is yieldingly moved by the spring 46.

One feature of this invention pertains to positioning the C-ring at an angle relative to its forward feeding movement within the parallel jaw channels 66. Each of the jaws, as shown in the exaggerated sectional view of Fig. 10, has its channel 66 communicating directly with the channels 65 of the tool body. In order to turn the C-ring 30 into the oblique position indicated in Fig. 10, a channel 80 is formed in each jaw at a desired obtuse angle relative to the channel 66. The channels 66 and 80 may be formed by a milling cutter or a small grinding wheel arranged at the required angle. In making the groove 80, the cutter will strike rearwardly to a point where it just passes the front end of the groove 66 and thus forms a slight pocket 82 at the rear. It will be appreciated that when the pusher moves the C-ring forward into the groove 66, the inturned legs of the C-ring will move around the curve formed by the communicating channels 66 and 80 which is suitably shaped for the purpose. The legs of the ring will ultimately project outwardly from the channels 80 and leave only the connecting back portion of the ring and the adjacent bowed corner portions of the legs riding in the channel 80. Thus, the legs swing freely and the ring follows around the bend formed by the two merging passages 66 and 80. As the ring approaches the end of its travel, as limited by the forward motion of the pusher 64, the legs of the ring will swing about the axis of the back portion of the ring and thus they will face properly along the grooves 80 in the required angular arrangement as indicated in Fig. 10. It will also be observed that as the ring 30 moves around the groove into the channel 80, its rear back portion is turned slightly sideways into the pockets 82 of the jaw groove 80, but the ring back remains substantially perpendicular to a plane parallel with the body grooves or channel 65. Thus that pocket 82 forms a firm backing for the open C-ring and any force applied longitudinally to the legs of the ring cannot thrust the ring back into the channel 66 but will seat the ring more firmly in the pocket. Since the jaws are moved toward each other at an angle to the legs, the grooves 80 in the two jaws are made at slightly different angles as indicated in Figs. 11 to 13 so that the legs will face away from each other (Figs. 12), and when the ring has been closed, as shown in Fig. 13, the legs will lie side by side. The arrangement of the grooves in the jaw will, therefore, determine the exact shape of the final closed ring.

It will now be appreciated that, in accordance with the above disclosure, we have provided a C-ring clinching tool in which the rings are fed serially into the jaw grooves and are there held under a slight resilient pressure provided by the spring 46 and the freedom of movement of the cam followers 24 as permitted by the very shallow recesses 50 in the cam slots 25. This recess 50 need not be more than 1/32" deep so that the permitted yielding movement is only sufficient to insure that the ring 30 is held by frictional pressure by the spring 46 and its shape has not been distorted prior to the enforced closing of the jaws 16 by the straight line inner faces of the cam grooves 25 beyond the cut out portions 50. The length of that recess 50, shown exaggerated in Fig. 3, is only sufficient to permit the required yielding movement under the resilient pressure of the lower slide 40 during the last portion of travel of the ring feeding slide 64 in its moving the ring into the jaws. The forward movement of the slide 64 takes place while the jaws are being opened, and the jaws are fully open at the time when the ring is finally thrust into place, except for the slight resilient effort imparted by the spring 46 which tends to hold the jaws in a slightly closed position as determined by the depth of the recess 50 in the cam slot 25.

This yielding resiliency of jaw movement is coordinated with the jaw clinching operation, as above indicated. The reciprocable rack bars are so arranged and moved that the ring feeding slide 64 remains forward and aids in holding a ring in the jaws all of the time that the tool is at rest or when the piston 32 is in its rearmost position. When the pressure is applied to the piston and the rack bar 70 starts forward and the ring pusher 64 starts rearwardly, the pressure on the ring is maintained by the spring 46 while the cam follower 24 is passing the cut out 50 of the cam grooves and until the positively acting surfaces of the cam slots 25 start to close the jaws. Hence, the operation of the device involves holding the ring in the jaws by a resilient or yielding pressure and thereafter closing the jaws positively. The tool, when idle, maintains a ring in the jaws ready for insertion in the goods, and it is merely necessary for the operator thereafter to admit air to the piston chamber and cause the jaws to close with a positive action against the ring.

It will be appreciated that various modifications may be made in the construction within the scope of the appended claims. In the construction illustrated, the upper cam slide and the ring feeding slide move equally. If the pinion 73 is a stepped gear having the larger diameter gear meshing with the cam rack bar and its smaller diameter gear meshing with the upper rack bar, then the ring pushing slide will move faster and further, according to the gear ratio, than does the cam slide. Various constructional modifications may be made to meet specific requirements of the tool size, shape and operation. Hence, the above disclosure is to be interpreted as setting forth the principles of the invention and a preferred embodiment thereof and not as imposing limitations on the claims.

We claim:

1. A C-ring clinching tool comprising a body, jaws pivoted thereon which have opposed substantially equidistant grooves for receiving and holding a C-ring, said body having parallel grooves communicating with the jaw grooves, a magazine for feeding rings to said body grooves, power mechanism, resiliently acting means moved by said mechanism for urging the jaws yieldingly toward each other to a limited distance sufficient only to hold a ring frictionally therebetween, means including a pusher actuated by said mechanism for moving one ring at a time from said magazine along the parallel grooves to a position between the jaws where it is frictionally held, and means operated by said mechanism for moving the jaws positively to close the ring frictionally held therebetween.

2. A C-ring clinching tool comprising a body, jaw levers pivoted thereon, each lever having a jaw at one end and an operating member, said body and jaws having communicating grooves for guiding a C-ring to the jaws, a pusher for moving a C-ring within the grooves to said jaws, power mechanism including a pneumatically operated piston connected to move the pusher, and means including a resilient connection between said piston and the jaw operating members which urges the jaws yieldingly toward the ring to hold it frictionally in position.

3. A C-ring clinching tool comprising a body, jaw levers pivoted thereon, each lever having a jaw at one end and an operating member, said body and jaws having communicating grooves for guiding a C-ring to the jaws, a slidable pusher for moving a C-ring within the grooves to said jaws, a movable cam plate, said jaws having cam followers operated by the plate which move the jaws to close the same, said plate and pusher having opposed rack bars, a pinion therebetween which serves when the plate moves forward to move the pusher oppositely, and manually controlled power mechanism connected to move one rack bar and cause the other rack bar to move oppositely at the same time.

4. A tool according to claim 3 in which the power mechanism comprises a pneumatically operated piston, a controlling valve and means to urge the piston to a position of rest, and means connecting the piston with one rack bar which causes the ring pusher to remain in a forward position and maintain a ring in the jaws when the tool is idle.

5. A C-ring clinching tool comprising a body, jaw levers pivoted thereon having jaws at their ends and cam followers, power operated mechanism, a cam plate moved by said mechanism which causes the cam followers to close the jaws, a second cam plate cooperating to move the cam followers, a resilient connection between said second plate and the power mechanism which urges the jaws to grip a C-ring yieldingly when thrust therein, and means including a pusher to move a C-ring into frictional engagement with the yielding jaws.

6. A tool according to claim 5 comprising rack bars associated respectively with the ring pusher and a cam plate and a pinion operatively connected therebetween which causes the pusher to move a ring into the jaws while the cam plate moves to release the jaws for an opening movement.

7. A C-ring clinching tool comprising a body, jaw levers pivoted thereon, means including a power mechanism for moving the jaws to close a ring therein, said body having straight parallel grooves for guiding a ring to the jaws, said jaws having curved grooves continuous and merging with the body grooves which are shaped to cause rotation of the ring about its back and to present the ring with its back substantially perpendicular to a plane parallel with the straight body grooves and with its legs extending forward at an angle oblique to the body grooves, and means including a power operated pusher for moving the ring along said grooves and around the curve into position between the jaws.

8. A tool according to claim 7 in which the curved groove in each jaw has a laterally positioned pocket located near the beginning of the curve which receives the back of the ring and holds the ring in place after the latter has been moved around the curved groove, so that force applied against the legs of the ring seats the back of the ring in each pocket and further backward movement is prevented.

9. A C-ring clinching tool comprising a body, two jaw levers pivoted thereon, a movable cam plate and followers on the jaw levers arranged to close the jaws, said body having parallel grooves and each jaw having equi-distant grooves continuous with the adjacent body grooves which have their terminal portions curved to direct the C-ring into a position where its legs make an oblique angle relative to the parallel grooves and the back portion of the C-ring is substantially perpendicular to the body grooves, a pusher plate for moving the rings along said body grooves into the curved grooves of the jaw, and manually controlled power mechanism for moving the pusher plate to feed a ring to the jaws and to operate the jaws to close the ring.

10. A tool according to claim 9 comprising resilient means for applying a light pressure to the jaws for holding a ring frictionally positioned therebetween, whereby the pusher feeds the ring along the parallel grooves and into the jaws without distorting the ring.

11. A C-ring clinching tool comprising a body, jaw levers of the first class pivotally mounted on the body, each of which has a jaw at one end and a cam follower at the other arranged for clinching the ring, said body and jaws having inter-communicating grooves for positioning the ring between the jaws, a pusher to move the ring along said grooves to the jaws, two relatively slidable first and second cam plates, the first plate being operatively associated with the cam followers to open and close the jaws, said second plate having a cam which urges the jaws through a limited distance toward a closed position, power mechanism positively connected to the first plate and pusher to move them positively in opposite directions, and a resilient connection between the second cam plate and said mechanism which urges the jaws yieldingly toward each other to grip a C-ring frictionally therebetween, said first cam plate serving to close the jaws positively and clinch the ring.

12. A tool according to claim 11 in which the cam of the positively moved first plate has a recess and the resiliently connected plate has a nose engaging the cam follower while the latter is opposite the recess and thus resiliently urges the jaws into frictional engagement with the ring.

13. A C-ring clinching tool comprising a body, jaws pivoted thereon, said body and jaws having intercommunicating grooves for receiving and positioning a C-ring between the jaws, a pusher to move the ring along said body and jaw grooves, a single manually controlled power actuated mechanism, a camming device including a cam moved in opposite directions by said mechanism and cam followers connected to the jaws which serve to open and to close the jaws positively and independently of the pusher, and means interconnecting the pusher and the power mechanism which causes the pusher to feed a ring to the jaws when the camming device opens them.

14. A C-ring clinching tool comprising a body, pivoted levers thereon, each having a cam follower at one end and a jaw at the other end for receiving a C-ring, manually controlled power mechanism including a single reciprocable member, a camming device moved by said member which has separate camming surfaces arranged to move the cam followers positively in both directions to open and to close said jaws, said jaws having opposed grooves for holding a C-ring therein, a pusher for feeding a C-ring to the jaw grooves, and means whereby the pusher is moved forward by said member to feed said ring to the jaw grooves while the cam moves the followers to open the jaws.

15. A C-ring clinching tool comprising a body, jaws pivoted thereon which have opposed grooves for receiving a C-ring, a power actuated mechanism, a camming device actuated by said mechanism for moving the jaws to distort and clinch a C-ring therein, means including a pusher actuated by said mechanism which is mounted for moving the ring into position within the jaw grooves, and means independent of said pusher which yieldingly urges the jaws toward each other to provide a non-distorting and frictional engagement with the ring as the latter is moved into position by the pusher.

References Cited in the file of this patent

UNITED STATES PATENTS

| | | |
|---|---|---|
| 2,511,795 | Cote | Feb. 26, 1952 |
| 2,587,096 | Berger | Feb. 26, 1952 |
| 2,656,539 | Chilton | Oct. 27, 1953 |
| 2,730,719 | Steiner | Jan. 17, 1956 |